United States Patent [19]

Bartmann et al.

[11] 4,440,923

[45] Apr. 3, 1984

[54] METHOD OF PRODUCING HIGH-MOLECULAR WEIGHT POLYPHENYLENE OXIDES

[75] Inventors: Martin Bartmann, Recklinghausen; Hanns-Jorg Bax; Klaus Burzin, both of Marl; Wilfried Ribbing, Dorsten, all of Fed. Rep. of Germany

[73] Assignee: Chemische Werke Huls Ag, Marl, Fed. Rep. of Germany

[21] Appl. No.: 497,236

[22] Filed: May 23, 1983

[30] Foreign Application Priority Data

Jul. 2, 1982 [DE] Fed. Rep. of Germany ....... 3224691

[51] Int. Cl.$^3$ .............................................. C08G 65/44
[52] U.S. Cl. .................................... 528/216; 528/212; 528/214; 528/215; 528/217
[58] Field of Search .......................... 528/212, 214–217

[56] References Cited

U.S. PATENT DOCUMENTS

| | | | |
|---|---|---|---|
| 3,228,910 | 1/1966 | Stamatoff | 528/214 |
| 3,384,619 | 5/1968 | Hori et al. | 528/217 |
| 3,573,257 | 3/1971 | Nakashio et al. | 528/214 |
| 3,733,299 | 5/1973 | Cooper et al. | 528/214 |
| 3,787,361 | 1/1974 | Nakashio et al. | 528/214 |
| 4,085,124 | 4/1978 | Rutledge | 528/214 |
| 4,385,167 | 5/1983 | Floryan | 528/217 |

Primary Examiner—Lester L. Lee
Attorney, Agent, or Firm—Oblon, Fisher, Spivak, McClelland & Maier

[57] ABSTRACT

A method for producing high molecular-weight polyphenylene oxides which comprises the oxidative coupling of a diortho-substituted phenol in the presence of a copper-amine complex, and an activator of a polyvalent alcohol, an alkali or alkaline earth hydroxide, and, if necessary, the hydrobromide of a secondary amine.

14 Claims, No Drawings

METHOD OF PRODUCING HIGH-MOLECULAR WEIGHT POLYPHENYLENE OXIDES

BACKGROUND OF THE INVENTION

1. Field of the Invention

The object of the invention is a method of producing high-molecular weight polyphenylene oxide (PPO) by the oxidative coupling of a diortho-substituted phenol in the presence of a copper-amine catalyst complex; an activator of a polyvalent alcohol, and an alkali compound; and, optionally, the hydrobromide of a secondary amine.

2. Description of the Prior Art

PPO and methods of producing it are known. Such methods are described, for example, in Buhler, "Spezialplaste," Akademieverlag, Berlin, 1978 as well as in U.S. Pat. Nos. 3,306,874 and 3,306,875 and in DE-AS 22 17 161.

However, the methods in which diortho-substituted phenols are oxidatively coupled in the presence of oxygen by a copper amine complex have prevailed in industry.

High PPO molecular weights can be achieved with the method of DE-OS 24 46 425. Nevertheless, this method is avoided in practice, because the work must be performed at very high pressures. This involves considerable extra expense for equipment and safety measures.

French Patent No. 1,440,527 describes a method for making PPO by emulsion polymerization in which a combination of oleinic acid and triethanol amine is used, among others, as an emulsion agent.

The method of U.S. Pat. No. 335,257 for producing PPO by the oxidation of 2,6-dimethyl phenol with oxygen utilizes a catalyst containing metallic copper, a salt of bivalent copper, methanol and an amine.

DE-OS describes a method of producing PPO in which phenols are treated with oxygen in the presence of a copper amine complex and metal bromide. While an accelerating effect was demonstrated for alkali and alkaline earth bromides, non-metallic bromides, e.g. ammonium bromide, do not appear to show such acceleration.

A catalyst is used in Japanese Patent No. Sho-48-32793 which consists of:

1. a copper (I) salt,
2. a compound of an alkali or alkaline earth element which reacts in an alkaline manner, such as, lithium carbonate, sodium hydroxide or potassium acetate, and
3. a nitrile, e.g. propionitrile or phthalodinitrile. The oxidation occurs with oxygen or a mixture of oxygen and air in a 1:1 ratio.

However, previous methods are not satisfactory in practice. Oxygen is usually required as an oxidizing agent. In addition to the greater expense associated with the use of oxygen as compared to air, for example, the use of pure oxygen also involves a greater safety risk. Benzene of a solvent containing chlorine, such as, trichloroethylene is frequently used. However, these solvents should be avoided due to their suspected carcinogenic nature.

The reaction time should be under two hours in order to assure that the procedure is economical. Also, if the reaction time is longer, by-products can easily develop which add a disturbing discoloration to the reaction mixture.

Finally, a high degree of polymerization is also important. A degree of polymerization of 100 is required for manufacturing threads, fibers, coatings and other products (see DE Patent 20 12 443), and a degree of polymerization of 250 is desirable, so that a subsequent molding deformation is completely assured. This corresponds to a J-value of 50, that is, the relative viscosity change of a 0.5% solution of the reaction product in chloroform at 25° C. in relation to the concentration is over 50 ml/g.

Thus, a need continues to exist for a process which produces high-molecular weight PPO in a short reaction time, without having to use pure oxygen as an oxidizing agent, and with minimal risk to safety.

SUMMARY OF THE INVENTION

Accordingly, it is an object of the present invention to provide a process for producing PPO of high molecular-weight utilizing short reaction times.

It is also an object of this invention to provide a process for producing PPO with a high degree of polymerization.

Further, it is an object of the present invention to provide a process for producing PPO of high molecular-weight without having to use pure oxygen as an oxidizing agent and with minimal risk to safety.

According to the present invention, the foregoing and other objects are attained by providing a process for producing PPO of high molecular-weight with a relative viscosity change greater than 50 ml/g in relation to the concentration, measured in a 0.5% solution in chloroform at 25° C., by the oxidative coupling of a diortho-substituted phenol in the presence of a copper-amine catalyst and an activator of polyvalent alcohol, an alkali or alkaline earth hydroxide and, optionally, a hydrobromide of a secondary amine.

DETAILED DESCRIPTION OF THE PREFERRED EMBODIMENTS

According to the invention, a method has now been found by which the requirements described may not only be met but exceeded. This method utilizes a polyvalent alcohol and an alkali compound as an activator. High molecular weights, in particular, are obtained if the activator also contains the hydrobromide of a secondary amine, especially that of morpholine.

The polyvalent alcohol should have at most 4 carbon atoms between 2 hydroxyl groups. The molecular weight should not exceed 250. Examples are diols like ethylene glycol, 1,2- and 1,3-propane diol, 1,4-butane diol, neopentyl glycol and higher-value alcohols like glycerin and pentaerythrite.

A 20 to 60%, preferably 30 to 50% aqueous solution or suspension of an alkali or alkaline earth hydroxide is used. For example, sodium or potassium hydroxide may be used as alkali hydroxides, while calcium or barium hydroxides may be used as alkaline earth hydroxides.

The activator may also, optionally, contain salts of secondary amines and hydrobromic acid. The amines may be aliphatic or heterocyclic. They may contain a maximum of 5 carbon atoms. Examples of such amines are dimethyl amine, diethyl amine, pyrrolidine and piperidine. Morpholine is especially preferred.

Generally, an excess of the alkali compound should be used in relation to the amount of hydrobromide of the secondary amine used. There should be 1 to 25, preferably 2 to 10 moles of alkali or alkaline earth hydroxide, 1 to 30, preferably 3 to 15 moles of polyvalent alcohol and, if necessary, 0.1 to 20, preferably 1 to 7 moles of secondary amine hydrobromide per 100 moles phenol.

The method of the invention is distinguished in particular by the following advantages:

1. Air may be used as an oxidizing agent instead of oxygen.
2. Under conditions which are otherwise the same, the method described here results either in shorter reaction times or in higher degrees of polymerization. The best results are obtained with 2,6-dimethyl phenol.
3. The use of solvents presenting a risk of danger may be avoided.

The method of the invention may be performed with oxygen, oxygen-air mixtures or nitrogen air mixtures as desired, provided that the gas mixture contains at least 10% oxygen. It is possible to obtain even better PPO qualities in a shorter time with air mixtures enriched with oxygen; however, this involves greater expense for safety.

As is known, a copper (I) or a copper (II) salt and a primary, secondary or tertiary amine are used as the copper amine catalyst.

Examples of suitable copper salts are copper (I) chloride, copper (I) acetate, copper (II) chloride, copper (II) acetate, copper (II) sulfate, copper (II) carbonate and copper (II) bromide.

Suitable amines are butyl amine, dibutyl amine, dimethyl amine, pyridine and other such amines. However, morpholine is used with preference.

Since the presence copper is undesirable in the end product, the concentration of the copper amine catalyst is kept as low as possible, preferably in the range of 0.1 to 2.5 moles per 100 moles phenol.

2,6-diaryl phenols, especially 2,6-diphenyl phenol, may be used with success. However, it is preferable to use 2,6-di-n-alkyl phenols whose alkyl radical has 1 to 6 carbon atoms as the diortho-substituted phenols.

The highest degrees of polymerization are obtained with 2,6-dimethyl phenol. Slight amounts of impurities occasioned by the production of the phenols are tolerable. It is customary to start with reaction solutions which contain 5 to 40% by weight of monomeric phenol.

The polymerization reaction occurs, preferably, in aromatic solvents such as, toluol, xylol and o-dichlorobenzene. The general method for producing PPO is known. It is useful to add the copper salt, amine, polyvalent alcohol and, if desired, the hydrobromide of a secondary amine, to a solvent and then add a mixture of aqueous alkali or alkaline earth hydroxide solution and phenol to the solvent.

The reaction is usually conducted in a temperature range of 20° to 80° C., however, it is particularly advantageous to work at temperatures between 30° and 40° C.

The following comparison tests illustrate that satisfactory J-values are achieved neither solely with sodium hydroxide nor solely with ethylene glycol. The J-values obtainable with the invention are not even obtainable with an activator consisting of sodium hydroxide and sodium bromide.

The present invention will be further illustrated by certain examples and references which are provided for purposes of illustration only and are not intended to limit the present invention.

Example 1

800 g toluol, 2 g copper (II) chloride, 200 g morpholine and 3 g ethylene glycol were mixed in an agitating reactor. After the addition of 100 g 2,6-dimethyl phenol dissolved in 100 g toluol and 4 g 50% aqueous solution of NaOH, an air current of 200 1/h was introduced through a dip pipe and the polymerization was started.

The temperature of the reaction mixture was maintained between 30 and 35° C. After 90 minutes the reaction was stopped by the addition of 400 g 50% acetic acid. After phase separation the polymer was precipitated from the toluol phase by the addition of 800 g methanol.

The relative viscosity change (J-value) of the polymer obtained in relation to the concentration was determined rom a 0.5% solution in chloroform at 25° C. and is contained in Table 1.

Examples 2 to 8 and A to E

The method was the same as in Example 1, whereby only the activator was changed. The results are collected in Table 1.

TABLE 1

The examples of the invention are designated by numbers and the comparison examples by letters.

| Ex. | | Activator | J-value ml/g |
|---|---|---|---|
| 1 | 3 g | Ethylene glycol | 54 |
|   | 4 g | NaOH (50%) | |
| 2 | 6 g | Ethyleneglycol | 56 |
|   | 2 g | NaOH (50%) | |
| 3 | 4 g | 1,2-Propanediol | 52 |
|   | 4 g | NaOH (50%) | |
| 4 | 4.5 g | Glycerin | 54 |
|   | 4 g | NaOH (50%) | |
| 5 | 3 g | Ethylene glycol | 70 |
|   | 5 g | Morpholinium bromide | |
|   | 4 g | NaOH (50%) | |
| 6 | 3 g | Ethylene glycol | 67 |
|   | 5 g | Diethyl ammonium bromide | |
|   | 4 g | NaOH (50%) | |
| 7 | 6 g | Ethylene glycol | 72 |
|   | 7.5 g | Morpholinium bromide | |
|   | 4 gm | NaOH (50%) | |
| 8 | 4.5 g | Glycerin | 70 |
|   | 5 g | Morpholinium bromide | |
|   | 4 g | NaOH (50%) | |
| A | | | 35 |
| B | 5 g | Morpholinium bromide | 44 |
| C | 3 g | Ethylene glycol | 46 |
| D | 4 g | NaOH (50%) | 40 |
| E | 4 g | NaOH (50%) | 42 |
|   | 5 g | NaBr | |

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method of producing high molecular-weight polyphenylene oxides, having a relative viscosity change in relation to the concentration greater than 50 ml/g, measured in a 0.5% solution in chloroform at 25° C., comprising the oxidative coupling of a diortho-substituted phenol having the formula:

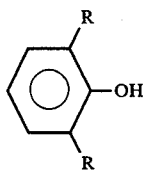

wherein R is an n-alkyl radical with 1 to 6 carbon atoms or an aryl radical, in the presence of an oxidizing agent, an organic solvent, a copper-amine catalyst which comprises a copper salt and an amine, and an activator, which comprises a polyvalent alcohol and a 20 to 60% solution suspension of an alkali or alkaline earth hydroxide, in a temperature range of 20° to 80° C., wherein X moles of alkali or alkaline earth hydroxide, and y moles of polyvalent alcohol are used per 100 moles of said phenol, wherein $1<X<25$ and $1<Y<30$.

2. A method of producing high molecular-weight polyphenylene oxides according to claim 1, wherein said activator further comprises z moles of a hydrobromide of a secondary amine, wherein $0.1<Z<20$ and $Z<X$.

3. The method of producing high molecular-weight polyphenylene oxides according to claim 2, wherein $2<X<10$, $3<Y<15$, and $1<Z<7$.

4. The method of producing high molecular-weight polyphenylene oxides according to claim 2, wherein said secondary amine is selected from the group of dimethyl amine, diethyl amine, pyrrolidine, piperidine and morpholine.

5. The method of producing high molecular-weight polyphenylene oxides according to claim 4, wherein said secondary amine is morpholine.

6. The method of producing high molecular-weight polyphenylene oxides according to claim 1, wherein said oxidizing agent is oxygen, a mixture of oxygen-air, a mixture of nitrogen-air or a mixture thereof, wherein said oxidizing agent comprises at least 10% of oxygen.

7. The method of producing high molecular-weight polyphenylene oxides according to claim 1, wherein the diortho-substituted phenol is 2,6-dimethyl phenol.

8. The method of producing high molecular-weight polyphenylene oxides according to claim 1, wherein the diortho-substituted phenol is 2,6-diphenyl phenol.

9. The method of producing polyphenylene oxides according to claim 1, which comprises adding the copper salt, the amine, and the polyvalent alcohol to the organic solvent, and then adding a mixture of aqueous alkali or alkaline earth hydroxide solution and the phenol to said organic solvent.

10. The method of producing polyphenylene oxides according to claim 2, which comprises adding the copper salt, the amine, the polyvalent alcohol, and the hydrobromide of a secondary amine to the organic solvent, and then adding a mixture of alkali or alkaline earth hydroxide solution and the phenol to said organic solvent.

11. The method of claim 1, wherein the temperature is in the range of 30° to 40° C.

12. The method of claim 1, wherein the concentration of the copper amine catalyst is in the range of 0.1 to 2.5 moles per 100 moles of phenol.

13. The method of claim 1, wherein the organic solvent is an aromatic organic solvent selected from the group consisting of toluol, xylol, o-dichlorobenzene, or a mixture thereof.

14. The method of claim 1, wherein the amine of said copper-amine catalyst is morpholine.

* * * * *